(12) United States Patent
Toyofuku et al.

(10) Patent No.: US 6,181,380 B1
(45) Date of Patent: Jan. 30, 2001

(54) ELECTRONIC IMAGE PICKUP APPARATUS HAVING A LIGHT WEIGHT AND EASY TO ASSEMBLE LENS BARRIER SUPPORTING MECHANISM WHICH REQUIRES LITTLE FORCE TO OPERATE

(75) Inventors: Toshiyuki Toyofuku; Hiroki Onda, both of Hachioji; Kaoru Kaneko, Kunitachi; Takashi Inoue, Hachioji; Yu Sato, Hino, all of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 08/907,192

(22) Filed: Aug. 6, 1997

(30) Foreign Application Priority Data

Aug. 9, 1996 (JP) .................................................. 8-211443

(51) Int. Cl.$^7$ .................................................. H04N 5/225
(52) U.S. Cl. ........................................... 348/373; 348/376
(58) Field of Search .................................. 348/373, 376; 396/448, 535

(56) References Cited

U.S. PATENT DOCUMENTS

| | | | |
|---|---|---|---|
| 5,159,372 | * 10/1992 | Nomura et al. | 396/448 |
| 5,406,413 | * 4/1995 | Mogamiya | 396/535 |
| 5,434,714 | * 7/1995 | Kohmoto et al. | 396/535 |
| 5,608,478 | * 3/1997 | Kamoda | 396/448 |
| 5,774,748 | * 6/1998 | Ito et al. | 396/448 |

* cited by examiner

*Primary Examiner*—Wendy Garber
*Assistant Examiner*—Mitchell White
(74) *Attorney, Agent, or Firm*—Frishauf, Holtz, Goodman, Langer & Chick, P.C.

(57) ABSTRACT

A pair of guide grooves are formed to extend parallel with each other on an outer surface of a housing of an electronic image pickup apparatus with a lens opening interposed therebetween. A lens barrier has both end portions engaged with the paired guide grooves and is movable between a close position for closing the lens opening and an open position for opening the lens opening while both end portions are guided by the guide grooves. One of the guide grooves opens in a cross direction crossing a front direction to which a front surface area, in which the lens opening is formed, on the outer surface of the housing, is directed, and the other of the guide grooves opens in the front direction on the outer surface of the housing. One of the end portions of the lens barrier corresponding to the one guide groove is inserted into and engaged with the one guide groove to be slidable along the one guide groove, and the other of the end portions of the lens barrier corresponding to the other guide groove is inserted into and engaged with the other guide groove to be slidable along the other guide groove. A separation protection member is fixed on the outer surface of the housing to cover at least part of the opening of the other guide groove after the other end portion of the lens barrier has been inserted into the other guide groove, and engages with the other end portion of the lens barrier in the front direction to prevent the other end portion of the lens barrier from separating from the opening of the other guide groove.

2 Claims, 5 Drawing Sheets

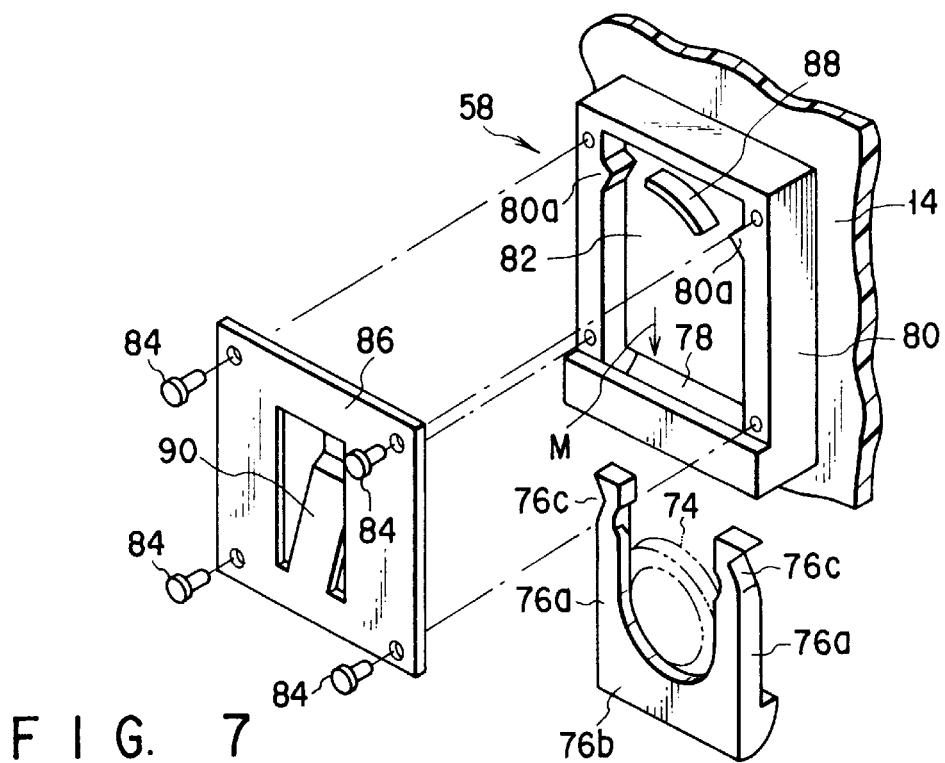
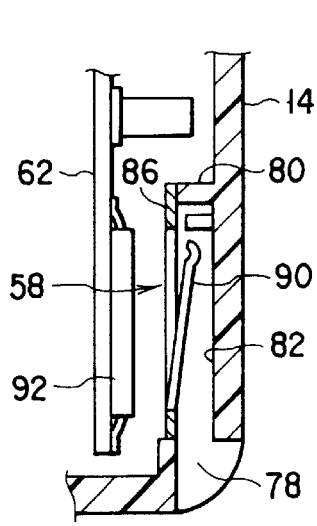
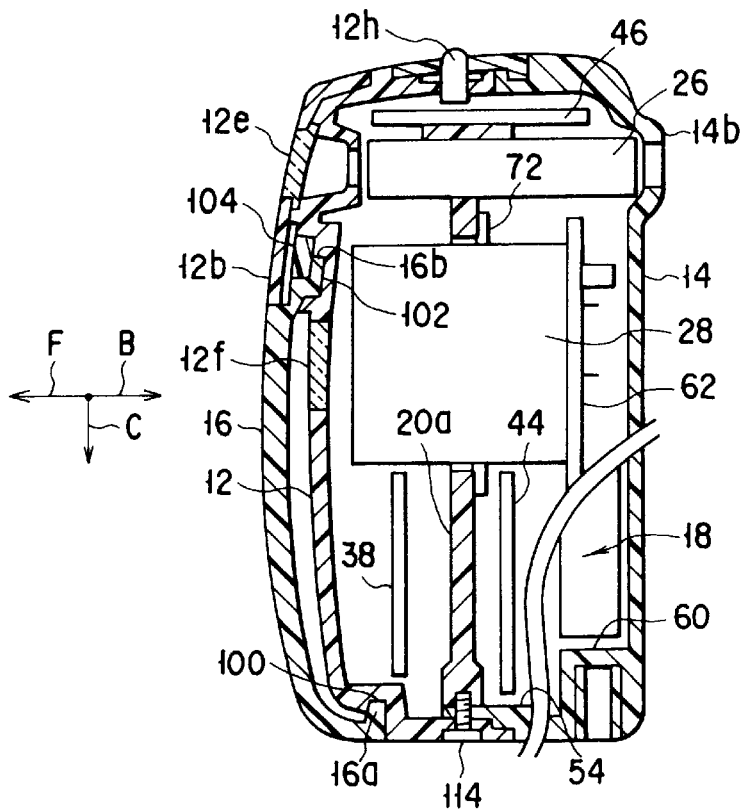
FIG. 7
FIG. 8
FIG. 9

ELECTRONIC IMAGE PICKUP APPARATUS HAVING A LIGHT WEIGHT AND EASY TO ASSEMBLE LENS BARRIER SUPPORTING MECHANISM WHICH REQUIRES LITTLE FORCE TO OPERATE

BACKGROUND OF THE INVENTION

The present invention relates to an electronic image pickup apparatus.

Conventionally, an electronic image pickup apparatus for picking up an image, formed on a charge coupled device by a lens unit, through the charge coupled device has been well known. In the electronic image pickup apparatus field, it is always desired to provide a smaller and lighter apparatus and to facilitate assembly.

BRIEF SUMMARY OF THE INVENTION

The present invention has been made in the above-described circumstances. It is therefore an object of the present invention to provide an electronic image pickup apparatus which is smaller and lighter than the conventional apparatus and which can be easily assembled.

To attain the above-described object, the electronic image pickup apparatus according to the present invention comprises: a housing which houses a lens unit for electronically picking up an image, and which has a lens opening for introducing light into the lens unit; a pair of guide grooves extending parallel with each other while putting the lens opening between the guide grooves on an outer surface of the housing; and a lens barrier having both end portions engaged with the paired guide grooves and being movably guided by the paired guide grooves between a close position for closing the lens opening and an open position for opening the lens opening. One of the paired guide grooves opens in a cross direction crossing a front direction to which a front surface area, in which the lens opening is formed on the outer surface of the housing, is directed, and the other of the paired guide grooves opens in the front direction on the outer surface of the housing. One end portion of the both end portions of the lens barrier corresponding to the one guide groove is inserted into and engaged with the one guide groove to be slidable along the one guide groove. The other end portion of the both end portions of the lens barrier corresponding to the other guide groove is inserted into and engaged with the other guide groove to be slidable along the other guide groove. A separation protection member engages with the other end portion of the lens barrier in the front direction and prevents the other end portion of the lens barrier from separating from the opening of the other guide groove. The separation protection member is fixed on the outer surface of the housing to cover at least part of the opening of the other guide groove after the other end portion of the lens barrier has been inserted into the other guide groove.

In the electronic image pickup apparatus according to the present invention and having such a structure, to slidably engage the both end portions of the lens barrier with the pair of guide grooves on the outer surface of the housing, prior to fixing the separation protection member to the outer surface of the housing, one of the end portions of the lens barrier corresponding to one guide groove is inserted into the one guide groove in the cross direction crossing the front direction, to which the front surface area in which the lens opening is formed on the outer surface of the housing, is directed. And the other end portion of the lens barrier corresponding to the other guide groove is inserted into the other guide groove in a direction opposite to the front direction. Thereafter, the separation protection member is fixed to the outer surface of the housing.

Thus, there is no need to apply strong force to the assembly (which means engaging the both end portions of the lens barrier with the pair of guide grooves on the outer surface of the housing in the electronic image pickup apparatus according to the present invention). The fact that no strong force is applied to the both end portions of the lens barrier during assembly can not only facilitate the assembly but also make simple the structure of the lens barrier. As a result, the present invention can provide a simpler, lighter electronic image pickup apparatus than the conventional apparatus.

In the electronic image pickup apparatus according to the present invention and having the above-described structure, it is preferable that the one guide groove is formed in a lower surface area located below the front surface area on the outer surface of the housing and extending in a direction crossing the front surface area, and that the other guide groove is formed in the front surface area on the outer surface of the housing.

With such a structure, when observing the housing of the electronic image pickup apparatus while facing the lens opening in the front surface area, that is, observing the housing in the opposite direction, the one guide groove cannot be seen and also the other guide groove cannot be seen due to the presence of the separation protection member and a decorative sheet fixed on the outer surface of the housing. Thus, the housing of the electronic image pickup apparatus presents a streamlined appearance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is an enlarged exploded perspective view of an auxiliary power supply battery holder chamber shown in FIG. 4;

FIG. 8 is a partial cross-sectional view showing a positional relationship between the auxiliary power supply battery holder chamber shown in FIG. 4 and the main body frame within the housing shown in FIG. 1;

FIG. 9 is a cross sectional view almost along the finder unit and the photographic lens unit located at the left end portion (right end portion in FIG. 1) of the electronic image pickup apparatus, showing a structure for sliding movement of the lens barrier of the electronic image pickup apparatus in the embodiment according to the present invention between the close position shown in FIG. 1 and the open position shown in FIG. 2;

DETAILED DESCRIPTION OF THE INVENTION

Figure 1:
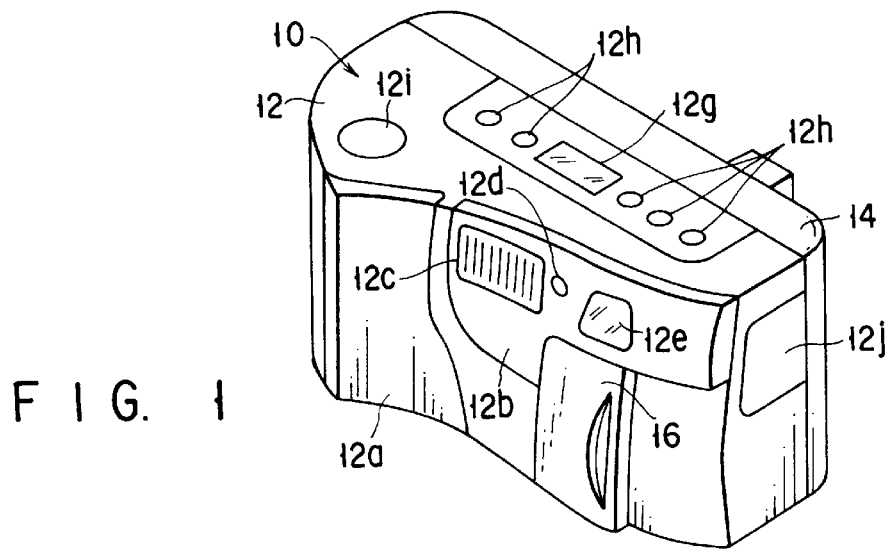
FIG. 1 is a perspective view schematically showing an obliquely upper front appearance of an electronic image pickup apparatus in one embodiment according to the present invention, in which a lens barrier of the apparatus is in a close position.
Figure 2:
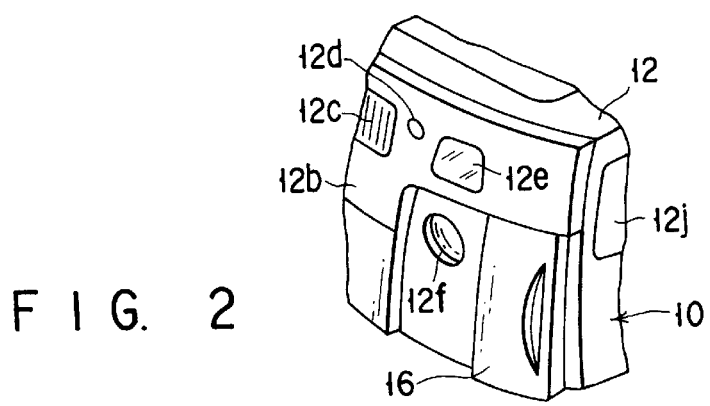
FIG. 2 is a perspective view schematically showing a part of the electronic image pickup apparatus of FIG. 1, in which the lens barrier of the apparatus is in an opening position.
Figure 3:
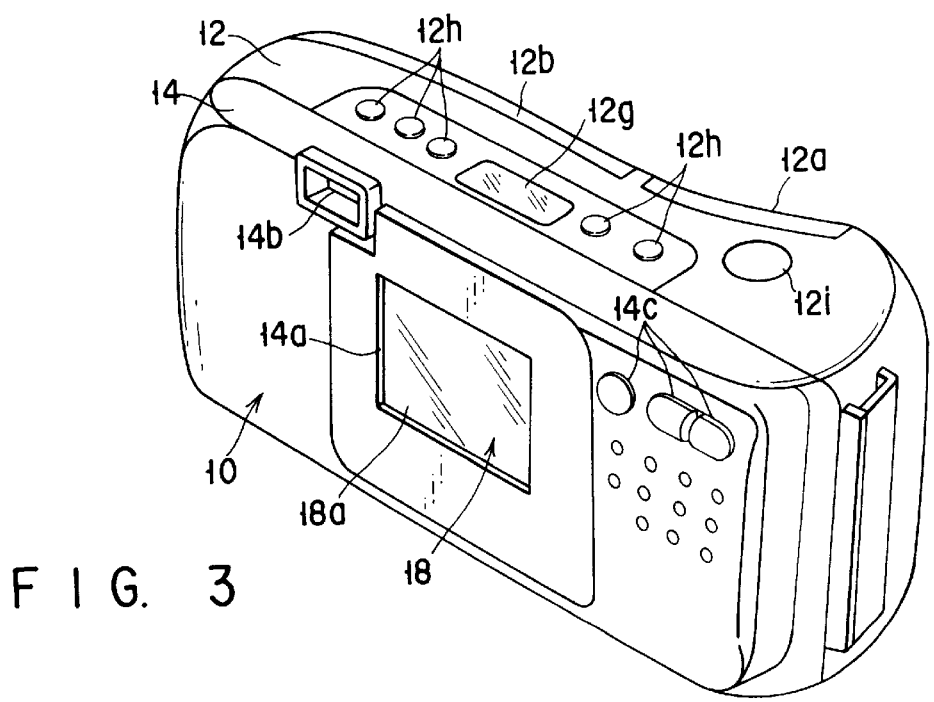
FIG. 3 is a perspective view schematically showing an obliquely upper rear appearance of the electronic image pickup apparatus of FIG. 1.

FIG. 1 is a perspective view schematically showing an obliquely upper front appearance of an electronic image pickup apparatus shown according to an embodiment of the present invention, in which a lens barrier of the apparatus is in a closed position. FIG. 2 is a perspective view schematically showing a part of the electronic image pickup apparatus of FIG. 1, in which the lens barrier of the apparatus is in an open position. FIG. 3 is a perspective view schematically showing an obliquely upper rear appearance of the electronic image pickup apparatus of FIG. 1.

In this embodiment, the electronic image pickup apparatus is a so-called digital camera for picking up an image by using a photoelectric transfer device such as a CCD (Charge Coupled Device), as an electronic image pickup means.

As shown in FIG. 1, a housing 10 of the electronic image pickup apparatus has a front housing member 12 and a rear housing member 14 which are detachably connected with each other. The front housing member 12 and the rear housing member 14 are made of synthetic resin such as polycarbonate resin and ABS resin.

A right end portion in a front surface area on an outer surface of the front housing member 12 (left end portion in FIG. 1) is expanded forward so that a user can easily catch the housing 10 with its right hand. A grip rubber 12a is attached on the right end portion in the front surface area to prevent the user's right fingers from slipping thereon with its sweat.

An inside of the expanded right end portion provides a battery storage space for storing main power supply batteries. A battery insertion opening for putting the main power supply batteries in and out of the space is provided in a right end portion in a lower surface area on the outer surface of the front housing member 12 (left end portion in FIG. 1). A battery cap is supported in the opening so as to be rotatable between open and close positions. The battery insertion opening, the battery cap and a bearing structure for the battery cap will be described later in detail.

A decorative sheet 12b is attached on an upper end portion in the front surface area on the outer surface of the front housing member 12 from almost a center of the upper end portion to a left end thereof (right end in FIG. 1). An electronic flash window 12c, a self-timer display window 12d and a viewfinder window 12e are formed in the decorative sheet 12b in this order from its center to its left end. An electronic flash opening, a self-timer display opening and a viewfinder opening (not shown) corresponding to the electronic flash window 12c, the self-timer display window 12d and the viewfinder window 12e on the decorative sheet 12b are formed in an upper end portion in the front surface area of the outer surface of the front housing member 12 corresponding to the decorative sheet 12b.

A lens barrier 16 is arranged below the decorative sheet 12b in the front surface area on the outer surface of the front housing member 12. The lens barrier 16 is slidable along the front surface area between a first position and a second position. In this first position, the lens barrier 16 is located under the self-timer display window 12d and the viewfinder window 12e and away from the left end (right end in FIG. 1) of the front surface area as shown in FIG. 1, and in the second position the lens barrier 16 is located rightward from the first position and reaches the left end of the front surface area as shown in FIG. 2.

A lens opening 12f is formed under the viewfinder window 12e in the front surface area as shown in FIG. 2. The lens barrier 16 located in the first position shown in FIG. 1 closes the lens opening 12f. The lens barrier 16 located in the second position shown in FIG. 2 opens the lens opening 12f. Thus, the first position of the lens barrier 16 shown in FIG. 1 is a close position and the second position thereof shown in FIG. 2 is an open position.

The sliding movement of the lens barrier 16 between the close position and the open position is performed by engaging upper and lower ends of the lens barrier 16 with a first guide groove (not shown) in the front surface area on the outer surface of the housing 10 and a second guide groove (not shown) in a lower surface area on the outer surface of the housing 10. The first guide groove is covered by the decorative sheet 12b, and the second guide groove located in a front end portion in the lower surface area on the outer surface of the housing 10 and extends from almost a center of the front end portion to a left end thereof (right end in FIG. 1) in parallel to the first guide groove. Structures of the first and second guide grooves and those of the upper and lower end portions of the lens barrier 16 slidably engaged with the guide grooves will be described later in detail.

As shown in FIG. 1, a photographic information display window 12g is provided in almost a center of a rear end portion in an upper surface area on the outer surface of the front housing member 12. In the housing 10, photographic information display means such as a liquid crystal display device is provided to correspond to the photographic information display window 12g. The photographic information display means displays various information of the electronic image pickup apparatus (such as setting and setting release of a self-timer mode various flash modes, a continuous photographic mode and photographic record delete mode, the number of frames, the residual quantity of the main power supply batteries, etc.). The various information displayed on the photographic information display means can be seen from the outside of the housing 10 through the photographic information display window 12g. Various operation buttons 12h for selecting the various information displayed on the photographic information display means are arranged on both sides of the photographic information display window 12g on the rear end portion in the upper surface area.

A shutter button 12i is arranged on a forwardly expanded right end portion (left end portion in FIG. 1) of the upper surface area in the outer surface of the front housing member 12.

A terminal protection cover 12j is provided in a left end surface area (right end surface area in FIG. 1) on the outer surface of the front housing member 12 to be capable of freely opening and closing. A signal input/output terminal and an external power supply input terminal are hidden on a back side of the terminal protection cover 12j.

As shown in FIG. 3, an image display window 14a is formed in almost a center of a rear surface area on an outer surface of the rear housing member 14, and an image display portion (i.e. screen) of image display means 18 such as a liquid crystal display device stored in the housing 10 is exposed in the image display window 14a. A finder eyepiece window 14b is arranged in the left of the image display window 14a on an upper end portion in the rear surface area on the outer surface of the rear housing member 14. A plurality of image display operation buttons 14c for operating the image display means 18 are arranged in the right of the finder eyepiece window 14a on the upper end portion on the rear surface area.

Figure 4:
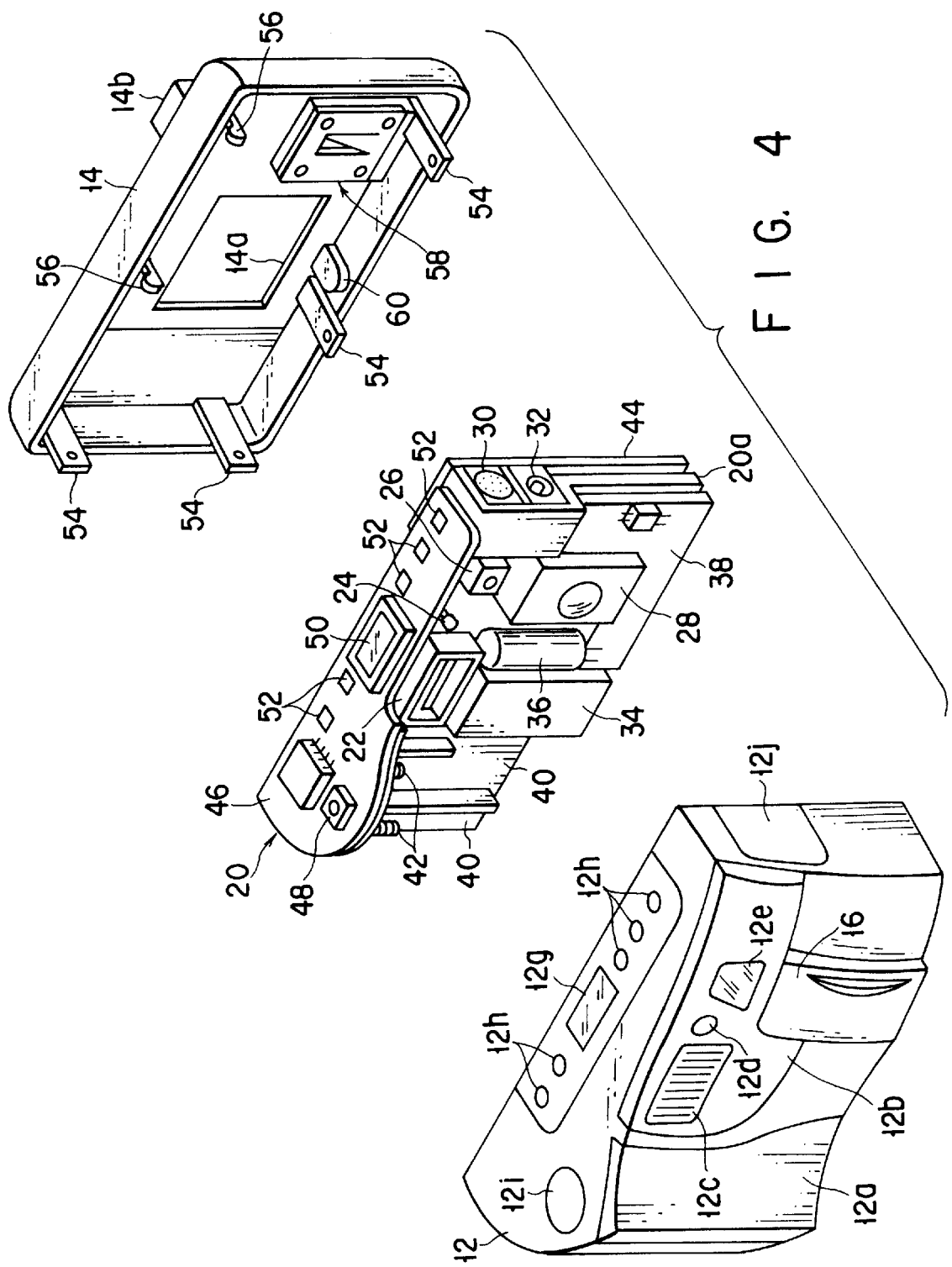
FIG. 4 is an exploded perspective view of the electronic image pickup apparatus shown in FIG. 1.

FIG. 4 is an exploded, perspective view of the electronic image pickup apparatus of FIG. 1. It shows the front housing member 12, the rear housing member 14 separated from the front housing member 12 and a main body block 20 usually stored between the front housing member 12 and the rear housing member 14.

The main body block 20 comprises a main body frame 20a having a projection surface almost equal to a front surface area on an inner surface of the front housing member 12 and a rear surface area on an inner surface of the rear housing member 14. In the main body frame 20a, a light emitting portion 22 of electronic flash light emitting means is provided in a position corresponding to the electronic flash window 12c of the front housing member 12. The light emitting portion 22 includes a Xenon discharge tube and a light reflection umbrella.

In the main body frame 20a, front ends of a light emitting device 24 for displaying an operation of a self-timer and a finder unit 26 are arranged in positions corresponding to the self-timer display window 12d and the viewfinder window 12e of the front housing member 12, respectively. A rear end of the finder unit 26 corresponds to the finder eyepiece window 14b of the rear housing member 14.

In the main body frame 20a, a photographic lens unit 28 is arranged in a position located below the finder unit 26 and corresponding to the lens opening 12f of the front housing member 12. Electronic image pickup means using a photoelectric transfer device such as a CCD (Charge Coupled Device) is incorporated in an inner end of the photographic lens unit 28.

In the main body frame 20a, the above described signal input/output terminal 30 and the above described external power supply input terminal 32 located in the back side of the terminal protection cover 12j in the left end surface area on the outer surface of the front housing member 12 are arranged in the left (right in FIG. 4) of the finder unit 26 and in that of the photographic lens unit 28.

In the main body frame 20a, a booster 34 for increasing a predetermined voltage from the main power supply batteries to another predetermined voltage to drive respective circuits and an electronic flash capacitor 36 for storing electric charges to emit light from the electronic flash light emitting means are arranged below the light emitting portion 22. Further, in the main body frame 20a, an electronic flash substrate 38 is arranged in an area facing the front surface area on the inner surface of the front housing member 12 to extend from the booster 34 arranged almost in a center in a lateral direction of the main body frame 20a to the left end (right end in FIG. 4) thereof, so as not to contact the electronic flash capacitor 36, the photographic lens unit 28, the signal input/output terminal 30 and the external power supply input terminal 32. A well known circuit for controlling the operation of the electronic flash light emitting means is provided on the electronic flash substrate 38.

Furthermore, a right end portion (left end portion in FIG. 4) of the main body frame 20a extending from the booster 34 almost in the center in the lateral direction of the main body frame 20a to the right end (left end in FIG. 4) cooperates with the forwardly expanded right end portion (left end portion in FIG. 4) in the front surface area of the front housing member 12 to define a barrier plate for defining a battery storage space 40 for storing a plurality of main power supply batteries (not shown). A plurality of contact terminals 42 for the main power batteries (not shown) stored in the battery storage space 40 are provided on the upper right end portion (upper left end portion in FIG. 4) of the main body frame 20a.

The battery opening of the battery storage space 40 is formed in the right end portion (left end portion in FIG. 1) in the lower surface area on the outer surface of the front housing member 12. As described before, the battery opening and the battery cap thereof will be described later in detail.

In the main body frame 20a, an external interface substrate 44 connected to the signal input/output terminal 30 and to the external power supply input terminal 32 is arranged in a portion corresponding to a right side of the image display window 14a in the rear surface area on the inner surface of the rear housing member 14.

A switch/display substrate 46 is arranged on an upper end of the main body frame 20a to correspond to an upper surface area on the inner surface of the front housing member 12. A shutter operating switch 48 is arranged on the switch/display substrate 46 in a position corresponding to the shutter button 12i in the upper surface area on the outer surface of the front housing member 12 to be operated by the shutter button 12i. Information display means 50 such as a liquid crystal display device and various operation switches 52 are further arranged on the switch/display substrate 46 to correspond to the photographic information display window 12g and the various operating buttons 12h in the upper surface area on the outer surface of the front housing member 12, respectively.

A plurality of connector pieces 54 and a plurality of engaging pieces 56 are formed on a peripheral portion of the rear surface area on the inner surface of the rear housing member 14. The connector pieces 54 are used for connecting the rear housing member 14, together with the main body block 20, with the front housing member 12 by using fixed screws (not shown), and the engaging pieces 56 are used for engaging the rear housing member 14 with predetermined positions of the front housing member 12.

An auxiliary power supply battery holder chamber 58 for detachably holding an auxiliary power supply battery is provided on a lower right corner portion in the rear surface area on the inner surface of the rear housing member 14. A structure of the auxiliary power supply battery holder chamber 58 will be described later in detail.

A lower surface area on the inner surface of the rear housing member 14 is a cross surface area extending in a direction crossing the rear surface area on the inner surface of the rear housing member 14. In the lower surface area, a tripod support 60 having a tripod hole formed in a lower surface area (i.e. cross surface area) on the outer surface of the rear housing member 14 is formed in a position corresponding to almost the center of the image display window 14a in the lateral direction.

Figure 5:
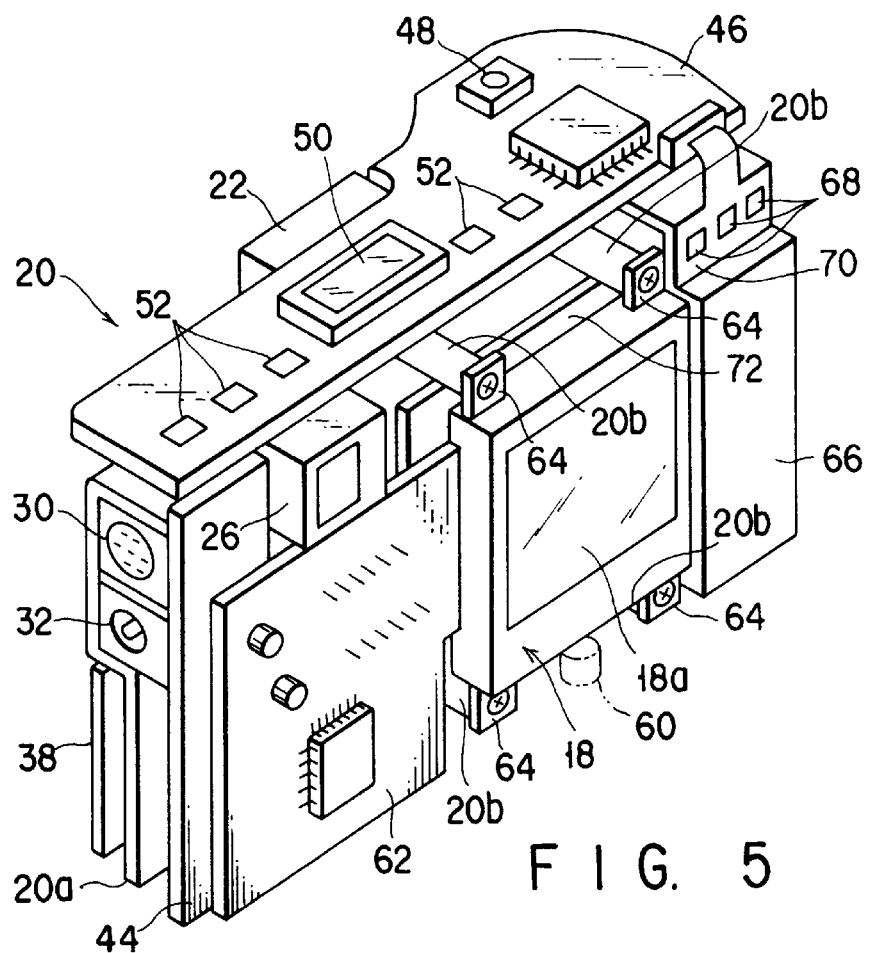
FIG. 5 is a perspective view showing an obliquely upper rear appearance of a main body block shown in FIG. 4.

FIG. 5 is a perspective view showing an obliquely upper rear appearance of the main body block 20 of FIG. 4.

As shown in FIG. 5, an image pickup substrate 62 is arranged in a back side of the external interface substrate 44 in the main body frame 20a of the main body block 20. On the image pickup substrate 62, a circuit for controlling the photographic lens unit 28 (see FIG. 4) and the electronic image pickup means (not shown) using the photoelectric transfer device such as a CCD (Charge Coupled Device) as mentioned above is formed.

In the main body frame 20a, the image display means 18 is arranged in a position corresponding to the image display window 14a in the rear surface area on the inner surface of the rear housing member 14. The image display means 18 has a flat rectangular shape. Mounting pieces 64 are protruded in upper and lower directions (that is, toward the upper surface area and the lower surface area on the inner surface of the rear housing member 14, each of these upper and lower surface areas serving as the cross surface area extending in the direction crossing the rear surface area in which the image display window 14a is formed) from right and left ends of each of upper and lower edges of the image display means 18. The upper and lower mounting pieces 64 of the image display means 18 are fixed to predetermined image display means fixing members 20b of the main body frame 20a by fixing screws (not shown). The upper and lower mounting pieces 64 facilitate a fixing work for fixing the image display means 18 to the main body frame 20a, thereby facilitating assembling of the electronic image pickup apparatus of this embodiment.

As described above, when the main body block 20, together with the rear housing member 14, is connected to the front housing member 12 and is housed in a predetermined position in the housing 10, the tripod support 60 in the lower surface area on the inner surface of the rear housing member 14 is arranged below the image display means 18 of the main body block 20 between a pair of mounting pieces 64 of the lower edge of the image display means 18, as shown in two-dot chain line in FIG. 5.

Since the tripod support 60 is arranged in a usually unused space arranged below the image display means 18 between the paired mounting pieces 64 of the lower edge of the image display means 18 in the housing 10, the space in the housing 10 can be used more effectively. As a result, there is no need to increase the thickness and height of the housing 10 for arranging the tripod support 60 in the housing 10 and there is thereby no need to increase the outer dimensions and the weight of the housing 10. (This contributes to make the electronic image pickup apparatus of this embodiment smaller and lighter than the conventional one.) Besides, the housing 10 can provide enough space for an arrangement of various components, thereby facilitating the assembly of the electronic image pickup apparatus of this embodiment.

On a right side of the image display means 18 in the main body frame 20a, a booster 66 is arranged. The booster 66 is used for increasing a predetermined voltage from the main power supply batteries (not shown) stored in the battery storage space 40 on the right end portion (left end portion in FIG. 4) in the front surface of the main body frame 20a shown in FIG. 4, to another predetermined voltage required for the image display means 18.

Above the booster 66 in the main body frame 20a, an image display operation substrate 70 is arranged. A plurality of image display operating switches 68 are arranged o the substrate 70 so as to be operated by a plurality of image display operating buttons 14c (see FIG. 3) arranged on the upper end portion in the rear surface area of the outer surface of the rear housing member 14.

A main substrate 72 including a central processing unit (not shown) for controlling the operation of the electronic image pickup apparatus of this embodiment is arranged on a front side of the image display means 18 in the main body frame 20a.

Figure 6:
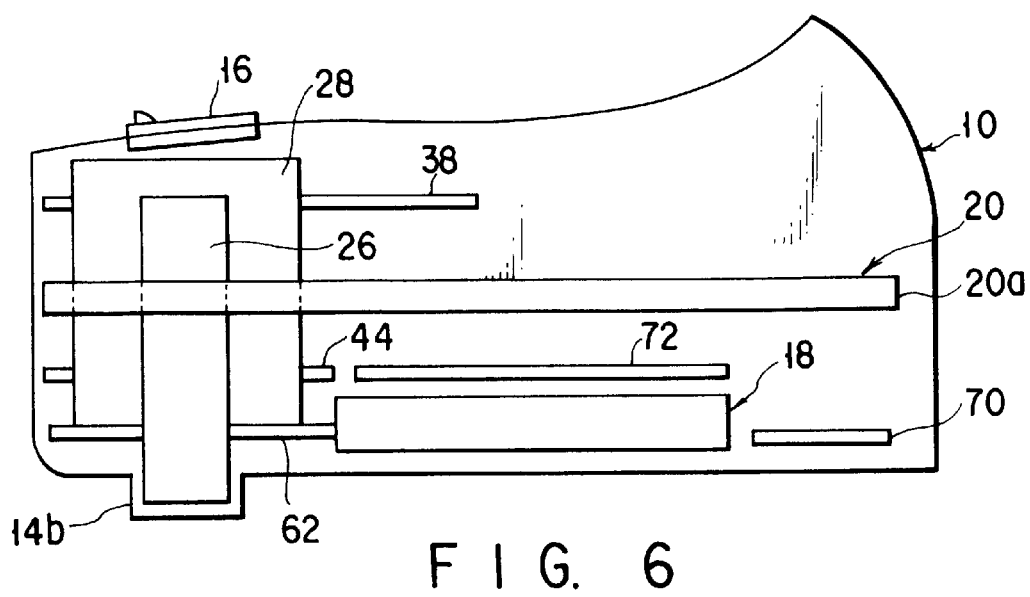
FIG. 6 is a top view showing an arrangement of a main body frame of the main body block, a finder unit, a photographic lens unit, an image display means, an electric flash substrate, an external interface substrate, an image pickup substrate, an image display operating substrate and a main substrate within a housing of the electronic image pickup apparatus shown in FIG. 1.

FIG. 6 is a top view schematically showing an arrangement of the main body frame 20a, the finder unit 26, the photographic lens unit 28, the image display means 18, the electronic flash substrate 38, the external interface substrate 44, the image pickup substrate 62, the image display operation substrate 70 and the main substrate 72 in the housing 10.

As shown in FIG. 6, the image display operation substrate 70 is located on the right side of the image display means 18, the finder eyepiece portion 14b of the finder unit 26 is located on the left side of the image display means 18 and the photographic lens unit 28 is located below the finder unit 26 on the left side of the image display means 18 in the housing 10.

Furthermore, the image display operation substrate 70 is located in the upper end portion on the rear surface area of the housing 10 in the right side of the image display means 18, the finder eyepiece portion 14b, that is, the finder unit 26 is located in the upper end portion on the rear surface area of the housing 10 in the left side of the image display means 18. Therefore, the housing 10 can provide a space for housing the photographic lens unit 28 below the finder unit 26 on the left side of the image display means 18.

Since the image display means 18 and the photographic lens unit 28 usually having a relatively large thickness do not overlap each other in a direction along an optical axis of the photographic lens unit 28, it is possible to reduce the outer dimensions or particularly the thickness of the housing 10 (a dimension in back and forth directions of the housing 10).

In the following description, the operation of the electronic image pickup apparatus of the embodiment according to the present invention and having the structure outlined above with reference to FIGS. 1 through 6, will be described.

A user of the above-described electronic image pickup apparatus holds the right end portion of the housing 10 with its right hand and moves the lens barrier 16 on the front surface of the housing 10 with its left hand from the close position shown in FIG. 1 to the open position in FIG. 2. This movement of the lens barrier 16 makes a main power supply switch turn on so that an image formed on the electronic image pickup means by the photographic lens of the photographic lens unit 28 is converted into an electric signal by the electronic image pickup means. The image formed on the electronic image pickup means can be displayed on the image display portion (that is, screen) 18a of the large image display means 18 shown in FIG. 3 by operating the plurality of image display operating buttons 14c on the rear surface of the housing 10. By turning on the main power supply switch, predetermined various information (such as the number of frames, the residual quantity of the main power supply batteries, etc. at present) relating to the electronic image pickup apparatus is displayed on the small photographic information display window 12g (shown in FIG. 1) on the upper surface of the housing 10. The predetermined various information displayed on the information display window 12g is changed by operating the various operating buttons 12h (shown in FIG. 1) on the upper surface of the housing 10.

When the user presses the shutter button 12i at a desired timing while the user presses its right eye on the finder eyepiece portion 14b to catch a desired photographic target (an object) through the finder 26 or observes an image displayed on the image display portion (that is, screen) 18a of the image display means 18, the image of the object at this moment is stored in a memory on the main substrate 72.

The image stored in the memory can be displayed on the image display portion (that is, screen) 18a of the large image display means 18 (shown in FIG. 3) by operating the plural image display operating buttons 14c (shown in FIG. 3) on the rear surface of the housing 10. In this operation, the user can operates the plural image display operating buttons 14c by using only its right thumb while the user holds the right end portion of the housing 10 with its right hand.

In other words, as shown in FIG. 3, since the finder eyepiece portion 14b is located in the left side of the image display means 18 and the plural image display operating buttons 14c (serving as image display operating members) are located in the right side of the image display means 18 on the rear surface of the housing 10, the user can carry out both the photographic operation and the reproduction operation by using only its right hand while holding the right end portion of the housing 10 with its right hand, by the photographic operation the shutter button 12i being depressed while catching a desired photographic target (an object) through the finder unit 26 or observing the image displayed on the image display portion (that is, screen) 18a of the image display means 18 and by the reproduction operation the image stored in the memory being displayed on the image display portion (that is, screen) 18a of the large image display means 18 in the electronic image pickup apparatus of this embodiment. Consequently, it is possible to easily use the electronic image pickup apparatus of this embodiment.

When the image stored in the memory is not necessary, it can be erased from the memory by operating the various operating buttons 12h (shown in FIG. 1) on the upper surface of the housing 10.

The above-mentioned reproduction and erase operations can be conducted while the lens barrier 16 is located in the close position. That is, even if the main power supply switch is turned off while the lens barrier is located in the close position, the main power supply switch can be turned on by operating the plural image display operating buttons 14c and the reproduction operation for displaying the image stored in the memory can be displayed on the image display portion (that is, screen) 18a of the large image display means 18 shown in FIG. 3. In addition, in this state, the erase operation for erasing unnecessary images stored in the memory from the memory can be performed by operating the various operating buttons 12h (shown in FIG. 1) on the upper surface of the housing 10.

Moreover, if desired flash mode or self-timer mode is set in the above electronic image pickup apparatus by operating the various operating buttons 12h (shown in FIG. 1) on the upper surface of the housing 10 before pressing the shutter button 12i, the electronic image pickup apparatus can be operated in the desired flash mode or self-timer mode when pressing the shutter button 12i. It is also possible to change or release the flash mode now being set or release the self-timer mode by operating the various operating buttons 12h.

If the terminal protection cover 12j (shown in FIG. 1) on the left end surface (right end surface in FIG. 1) of the housing 10 is opened and a signal input/output terminal connector (not shown) is connected to the signal input/output terminal 30 shown in FIGS. 3 and 5, the image stored in the memory can be outputted to, for example, an external computer or image processing apparatus such as a printing machine. If an external power supply connector (not shown) is connected to the external power supply input terminal 32 shown in FIGS. 3 and 5, the main power supply for the electronic image pickup apparatus of this embodiment is instantly changed from the main power supply batteries (not shown) in the battery storage space 40 (see FIG. 4) in the right end portion (left end portion in FIG. 1) of the housing 10, to the external power supply, thereby preventing the consumption of the main power supply batteries (not shown). Additionally, if the external power supply connector (not shown) is separated from the external power supply input terminal 32 shown in FIGS. 3 and 5, the main power supply for the electronic image pickup apparatus of this embodiment is instantly changed from the external power supply to the main power supply batteries (not shown) in the battery storage space 40 (see FIG. 4) in the right end portion (left end portion in FIG. 1) of the housing 10.

A structure of the auxiliary power supply battery holder chamber 58 shown in FIG. 4 will now be described with reference to FIGS. 7 and 8.

FIG. 7 illustrates an enlarged, perspective exploded view of the auxiliary power supply battery holder chamber 58 shown in FIG. 4. FIG. 8 illustrates a partial cross-sectional view showing a positional relationship between the auxiliary power supply battery holder chamber 58 of FIG. 4 and the image pickup substrate 62 of the main body frame 20 in the housing 10.

An auxiliary battery 74 housed in the auxiliary power supply battery holder chamber 58 has a disc like shape and has one electrode on a periphery thereof and another electrode on one end surface thereof. The auxiliary power supply battery 74 is used for backing up the various circuits used in the electronic image pickup apparatus of this embodiment.

The auxiliary power supply battery holder chamber 58 has a flat battery holder 76b having a pair of clipping arms 76a of an almost U-shape. The flat battery holder 76b detachably holds one part of the periphery and one part of a peripheral edge portion of one end surface of the auxiliary power supply battery 74 by the paired clipping arms 76a between the arms 76a. Therefore, in the battery holder 76b, the other part of the periphery of the auxiliary power supply battery 74 is exposed in a direction in which tip ends of the paired clipping arms 76a extend and both end surfaces of the auxiliary power supply battery 74 is exposed between the paired clipping arms 76a.

The battery holder 76b is made of non conductive, elastic material such as synthetic resin. Engaging recesses 76c are formed on opposing side surfaces of tip end portions of the paired clipping arms 76a.

The auxiliary power supply battery holder chamber 58 further has a battery holder insertion opening 78 for taking the battery holder 76b into and out from the chamber 58. The opening 78 is formed along the rear surface area in the left end portion (right end portion in FIG. 4) of the lower surface area of the rear housing member 14 of the housing 10. The battery holder 76b holding the auxiliary power supply battery 74 is taken into and out from the chamber 58 through the battery holder insertion opening 78 while the periphery of the auxiliary power supply battery 74 is directed to the battery holder insertion opening 78. The auxiliary power supply battery holder chamber 58 has also a peripheral wall 80 formed in the vicinity of the lower surface area on the left end portion (right end portion in FIG. 4) of the rear surface area in the inner surface of the rear housing member 14. The peripheral wall 80 surrounds the periphery of the battery holder 76b, except for a portion of the periphery directing the battery holder insertion opening 78, when the battery holder 76 is inserted into the housing 10 from the battery holder opening 78.

A pair of engaging protrusions 80a are formed on the peripheral wall 80. The engaging protrusions 80a are elastically engaged with the engaging represses 76c of the tip end portions of the paired clipping arms 76a of the battery holder 76b when the holder 76b is inserted into a predetermined position in the housing 10 through the battery holder insertion opening 78.

The other end surface of the auxiliary power supply battery 74 opposite to the one end surface on which one electrode is provided faces an other end surface facing area 82 surrounded by the peripheral wall 80 in the vicinity of the lower surface area on the left end portion (right end portion in FIG. 4) of the rear surface area in the inner surface of the rear housing member 14 of the housing 10 when the battery holder 76b holding the battery 74 is located in the predetermined position within the housing 10. The one end surface on which one electrode of the auxiliary power supply battery 74 is provided faces a fixed side wall 86 detachably fixed to a protruding end of the peripheral wall 80 by well-known fixing means 84 such as a fixing screw.

Namely, the auxiliary power supply battery holder chamber 58 is defined by the peripheral wall 80 formed in the rear surface area of the inner surface of the rear housing member 14, the other end surface facing area 82 surrounded by the peripheral wall 80 on the rear surface area of the inner surface on of the rear housing member 14 and the fixed side wall 86 detachably fixed to the protruding end of the peripheral wall 80 by the well-known fixing means. A first terminal 88 is provided on the other end surface facing area 82, and a second terminal 90 is provided on the fixed side wall 86. The first terminal 88 contacts the other part of the periphery of the auxiliary power supply battery 74, the other part being exposed in the direction in which the tip ends of the paired clipping arms 76a of the battery holder 76b are directed and being the one electrode of the battery 74. The second terminal 90 contacts the other part of the one end surface of the auxiliary power supply battery 74, the other part being exposed between the paired clipping arms 76a of the battery holder 76b and being the other electrode of the battery 74.

The second terminal 90 is formed by punching the fixed side wall 86 made of a conductive, elastic material. The second terminal 90 may be formed by fixing a terminal piece of conductive, elastic material to the fixed side wall 86 made of non-conductive material.

In this embodiment, since the first and second terminals 88 and 90 for the electrodes of the auxiliary power supply battery 74 held by the battery holder 76b inserted through the battery holder insertion opening 78 into the auxiliary power supply battery holder chamber 58 of the housing 10, are provided on the other end surface facing area 82 surrounded by the peripheral wall 80 in the rear surface area of the rear housing member 14 and on the fixed side wall 86 fixed to the protruding end of the peripheral wall 80 in the rear surface area of the rear housing member 14, the electronic image pickup apparatus can be made smaller and lighter than the conventional apparatus and also assembled more easily. More precisely, when the above described structures of the first and second terminals 88 and 90 are compared with a case where the first and second terminals 88, 90 are supported by any other member within the housing 10, for example, the image pickup substrate 62 facing the auxiliary power supply battery holder chamber 58 as shown in FIG. 8, various components 92 can be arranged on the any other component such as the image pickup substrate 62 facing the auxiliary power supply battery holder chamber 58, so that an efficiency of using a surface of the any other component can be improved.

Further, since the structure of such an auxiliary power supply battery holder chamber 58 is simple, it is possible to easily provide the first terminal 88 on the other end surface facing area 82 on the inner surface of the housing 10 through a space surrounded by the protruding end of the peripheral wall 80 before the fixed side wall 86 is fixed to the protruding end of the peripheral wall 80. The second terminal 90 can be easily provided on the fixed side wall 86 before the fixed side wall 86 is fixed to the protruding end of the peripheral wall 80.

If the fixed side wall 86 is made of electric terminal material and the second terminal 90 is formed by a part of the fixed side wall 86, the fixed side wall 86, together with the second terminal 90, can be easily formed, thus making it possible to decrease the number of components of the electronic image pickup apparatus according to the present invention to thereby further facilitate the assembly of the apparatus.

Next, a structure for sliding of the lens barrier 16 between the close position of FIG. 1 and the open position of FIG. 2 will be described in detail.

Figure 10:
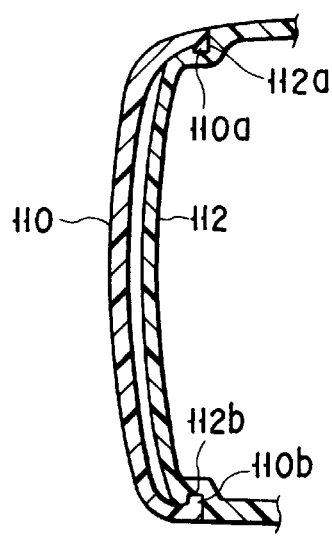
FIG. 10 is a schematic cross-sectional view showing a conventional structure for sliding movement of a conventional lens barrier between its close position and its open position.

FIG. 9 illustrates a cross sectional view almost along the finder unit 26 and the image pickup lens unit 28 on the left end portion (right end portion in FIG. 1) of the electronic image pickup apparatus. FIG. 9 shows the structure for sliding of the lens barrier 16 of the electronic image pickup apparatus of the embodiment according to the present invention between the close position of FIG. 1 and the open position of FIG. 2. FIG. 10 is a schematic cross-section view showing a conventional structure for sliding of a conventional lens barrier between its close position and its open position.

The structure for sliding of this embodiment has a pair of first and second guide grooves 100 and 102 arranged on portions located above and below a lens opening 12f for introducing light into the lens unit 12 on the outer surface of the front housing member 12. The first and second guide grooves 100 and 102 extend parallel with each other in a lateral direction.

The first guide groove 100 is located below the lens opening 12f on the front surface area in the outer surface of the front housing member 12 of the housing 10 and opens in a downward direction, indicated by an arrow C, which is one of cross directions crossing a front direction, indicated by an arrow F, in which the front surface area faces. The second guide groove 102 is located above the lens opening 12f and opens in the above-described front direction. More specifically, the first guide groove 100 is located in the vicinity of the front surface area in the lower surface area of the front housing member 12. The second guide groove 102 is located between the viewfinder window 12e and the lens opening 12f in the front surface area both of which are located above the lens opening 12.

Both upper and lower ends of the lens barrier 16 are engaged with the first and second guide grooves 100 and 102. To be more specific, the lower end portion of the lens barrier 16 corresponding to the lower first guide groove 100 has a first engaging claw 16a. The first engaging claw 16a is inserted through the lower opening of the first guide groove 100 into the first guide groove 100, engaged with the first guide groove 100 in the above front direction F and the rear direction indicated by an arrow B which is opposite to the front direction F and slidable along the first guide groove 100. The upper end portion of the lens barrier 16 corresponding to the upper second guide groove 102 has a second engaging claw 16b. The second engaging claw 16b is inserted through the front opening of the second guide groove 102 into the second guide groove 102, engaged with the second guide groove 102 in a vertical direction corresponding to the above-mentioned cross direction in this embodiment and slidable along the second guide groove 102.

After the lower first engaging claw 16a is inserted into the lower first guide groove 100, the lens barrier 16 rotates around the lower first engaging claw 16a engaged with the lower first guide groove 100 so that the upper second engaging claw 16b is directed to the upper second guide groove 102. By so doing, the upper second engaging claw 16b can be naturally and easily inserted into the upper second guide groove 102.

Thereafter, a separation protection member 104 is fixed to the front surface area of the front housing member 12 to cover an upper half of the upper second guide groove 102. The separation protection member 104 engages with an upper half of the upper second guide claw 102 on the upper end portion of the lens barrier 16 in the front direction F and protects the second engaging claw 102 from separating from the front opening of the second guide groove 102. In this embodiment, the separation protection member 104 is covered with a decorative sheet 12b and cannot be seen in the front surface area of the front housing member 12.

That is, in this embodiment, since the lower first guide groove 100 is located on the lower surface area in the outer surface of the front housing member 12 of the housing 10, it cannot be seen in a front view of the front housing 12. Although the upper second guide groove 102 is located on the front surface area in the outer surface of the front housing member 12 of the housing 10, it is covered with the separation protection member 104 and the decorative sheet 12b so that the upper second guide groove 102 cannot be seen in the front view of the front housing member 12. Thus, the electronic image pickup apparatus of this embodiment has a streamlined appearance in the front view of the front housing 12 of the housing 10.

In addition, to rotatably engage the first and second engaging claws 16a and 16b of the upper and lower end portions of the lens barrier 16 with the paired first and second guide grooves 100 and 102 on the outer surface of the housing 10, prior to fixing the separation protection member 104 to the outer surface of the housing 10, the first engaging claw 16a on the lower end portion of the lens barrier 16 corresponding to the first guide groove 100 is inserted through the lower opening of the first guide groove 100 into the first guide groove 100 from the lower surface area in one of the cross directions crossing the front direction F and the second engaging claw 16b on the upper end portion of the lens barrier 16 corresponding to the second guide groove 102 in the front surface area is inserted through the front opening of the second guide groove 102 into the second guide groove 102 in the direction B opposite to the front direction F. Thereafter, the separation protection member 104 is fixed to the outer surface of the housing 10. Therefore, there is no need to apply strong force to the assembling work (That is, the engaging work for engaging the first and second engaging claws 16a and 16b of the both upper and lower end portions of the lens barrier 16 with the paired first and second guide grooves 100 and 102 on the outer surface of the housing 100, in this embodiment). The fact that no strong force is applied to the upper and lower end portions of the lens barrier 16 during assembling work makes the assembling work ease and the structure of the lens barrier 16 being simple. As a result, compared to the conventional apparatus, the electronic image pickup apparatus according to the present invention can be smaller in size and lighter in weight.

Moreover, the above-described structure for the slidable movement of the lens barrier between the close position shown in FIG. 1 and the open position shown in FIG. 2 can make a distance between the first and second guide grooves 100 and 102 short. The distance between them (which corresponds to the height in the vertical direction of the housing 10) is shorter than the moving distance of the lens barrier 16 in a width direction (which corresponds to the lateral direction of the housing 10 in this embodiment). If a force applied to the lens barrier 16 to move the barrier 16, is not applied to a center in the vertical direction of the lens barrier 16, the couple of force generated on the upper and lower end portions of the lens barrier 16 becomes smaller. Thus, it is possible to always smoothly slide the lens barrier 16.

FIG. 9 also illustrates that the rear housing member 14 and the main body block 20 are connected to the front housing member 12 by the fixing screw 114 through the connector piece 54 of the rear housing member 14.

In a structure, shown in FIG. 10, for sliding a conventional lens barrier 110 between the close position and the open position, first and second engaging claws 110a and 110b on upper and lower end portions of the lens barrier 110 protrude to approach each other and are engaged with first and second engaging grooves 112a, 112b formed in upper and lower surface areas in an outer surface of a housing 112, the engaging grooves 112, 112b being opened upward and downward and extending along the front surface area. And, the engaging claws 110a, 110b are slidable along the first and second engaging grooves 112a, 112b.

With such a conventional structure, to engage the first and second engaging claws 110a and 110b on the upper and lower end portions of the lens barrier 110 with the first and second engaging grooves 112a and 112b of the housing 112, the lens barrier 110 is pressed against the front surface area of the housing 112 while the first and second engaging claws 110a and 110b on the upper and lower end portions of the lens barrier 110 are being directed to the upper and lower ends of the front surface area of the housing 112. The upper and lower end portions of the lens barrier 110 slidably contact with the upper and lower ends of the front surface area of the housing 112 and thereby elastically bent the upper and lower end portions so as to widen the distance between the upper and lower end portions of the lens barrier 110. Thereafter, the first and second engaging claws 110a and 110b are engaged with the first and second engaging grooves 112a and 112b of the housing 112 as shown in FIG. 10. In this conventional structure, since the upper and lower end portions of the lens barrier 110 are forcibly and elastically bent, the upper and lower end portions must be formed to have large strength so that a weight of the lens barrier 110 is increased. As a result, a weight of the conventional electronic image pickup apparatus having the structure for sliding the lens barrier 110 is increased.

Moreover, relatively strong force is required to forcibly and elastically bend the upper and lower end portions of the lens barrier 110. As a result, the engaging work for engaging the first and second engaging claws 110a and 110b on the upper and lower end portions of the leans barrier 110 with the first and second engaging grooves 112a and 112b of the housing 112 becomes hard. In some cases, the upper and lower end portions of the lens barrier 110 are damaged while they are forcibly and elastically bent.

With such a conventional structure, it is necessary to make the height of the lens barrier 110 equal to that between the upper and lower surface areas of the housing 112. Due to this, if the width of the lens barrier 110 in its moving direction is relatively smaller than the height of the lens barrier 110 and a force applied to the lens barrier 110 to move the barrier 110 is not applied to the center of the direction of the height of the lens barrier 110, then the large couple of force tends to occur on the upper and lower end portions of the lens barrier 110. As a result, the lens barrier 110 cannot slide smoothly. If the width of the lens barrier 110 is relatively larger than the height of the lens barrier 110 to slide the lens barrier 110 smoothly, the weight of the lens barrier 110 is increased to thereby increase the weight of the conventional electronic image pickup apparatus having the above described slidable structure for the lens barrier 110.

Now, a bearing structure for rotatably supporting the battery cap between a close position and an open position in the battery insertion opening formed in the right end portion (left end portion in FIG. 1) of the lower surface area on the outer surface of the front housing member 12 to take the main power supply batteries (not shown) in and out of the battery storage space 40 (see FIG. 4) provided inside the expanded right end portion (left end portion in FIG. 1) of the housing 10 in FIG. 1, will be described in detail.

Figure 11:
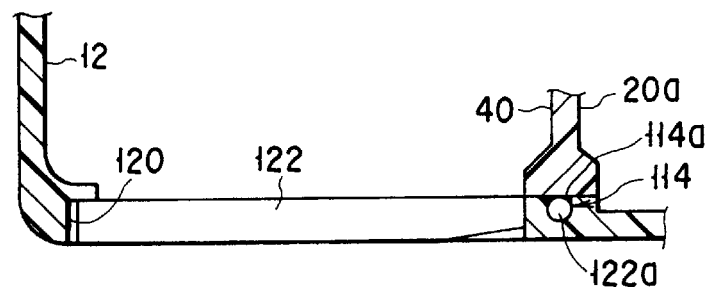
FIG. 11 is an enlarged, cross-sectional view showing a battery insertion opening formed at a right end portion (left end portion in FIG. 1) in a lower surface area on an outer surface of a front housing member of FIG. 1 and showing a bearing structure for supporting a battery cap to be rotatable between a close position in which the battery cap covers the battery opening and an open position in which the battery cap opens the battery opening.
Figure 12:
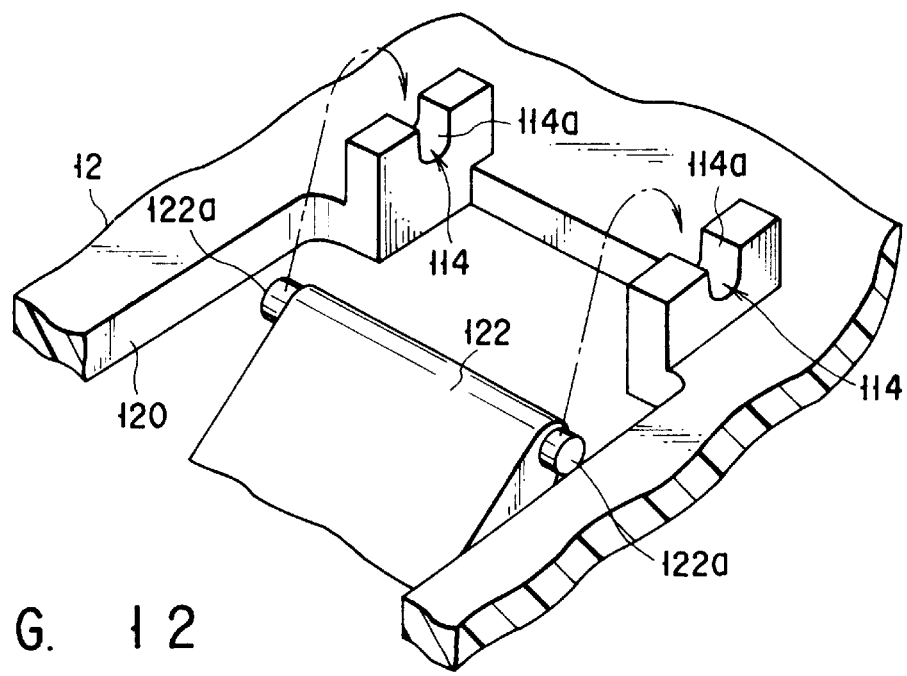
FIG. 12 is an enlarged, exploded perspective view of the battery opening and the bearing structure of the battery cap of FIG. 11.

FIG. 11 is an enlarged cross-sectional view showing the battery opening 120 formed in the right end portion (left end portion in FIG. 1) of the lower surface area on the outer surface of the front housing member 12 of FIG. 1 and showing the bearing structure for supporting the battery cap 122 rotatable between the close position and the open position in the battery opening 120. FIG. 12 is an enlarged, exploded perspective view of the battery opening 120, the bearing structure and the battery cap 122 of FIG. 11.

The bearing structure includes a pair of shaft supporting recess portions 114 provided in the lower surface area on the inner surface of the front housing member 12 of the housing 10 to face the lower end surface of the main body frame 20a. The shaft supporting recess portions 114 are spaced from each other by a predetermined distance in a direction in which the lower end surface of the main body frame 20a extends and have openings 114a covered with the lower end surface of the main body frame 20a in the housing 10, respectively. To be more specific, the paired shaft supporting repress portions 114 of this embodiment are formed on rear end portions of right and left edges of the battery insertion opening 120 on the lower surface area of the inner surface of the front housing member 12 to face the lower end surface of the main body frame 20a, and are spaced apart for a predetermined distance from each other in the extending direction of the lower end surface of the main body frame 20a.

The battery cap 122 comprises a pair of rotation center shafts 122a concentrically protruding in the lateral direction from rear ends of right and left edges thereof. The paired center shafts 122a are inserted into the paired shaft supporting recess portions 114 through the radial direction openings 114a as indicated by two-dot chain line shown in FIG. 12 just before the front housing member 12, the rear housing member 14 and the main body block 20 are connected to one another as shown in FIG. 9 while assembling the electronic image pickup apparatus according to the embodiment of the present invention. When the front housing member 12, the rear housing member 14 and the main body block 20 shown in FIG. 4 are connected to one another as shown in FIG. 9, the radial direction openings 114a of the paired shaft supporting recess portions 114 are covered with the lower end surface of the main body frame 20a within the housing 10 as shown in FIG. 11. By so doing, the battery cap 122 can be rotatable around the paired rotation center shafts 122a set in the paired shaft supporting recess portions 114 shown in FIG. 11 between the close position for covering the battery insertion opening 120 and the open position for opening the battery insertion opening 120.

The paired rotation center shafts 122a of the battery cap 122 are prevented from separating from the radial direction openings 114a of the paired shaft supporting recess portions 114 by the lower end surface of the main body frame 20a within the housing 10.

The bearing structure for the battery cap 122 characterized as described above is quite simple since the bearing structure is composed only of a pair of shaft supporting recess portions 114 provided on the inner surface of the housing 10 and the main body frame 20 housed in the housing 10 and having the lower end surface covering the radial direction openings 114a of the shaft supporting recess portions 114. Such a simple bearing structure makes the electronic image pickup apparatus of this invention being smaller and lighter than the conventional apparatus and makes the assembling work of the electronic image pickup apparatus of this invention become simpler than that of the conventional apparatus.

Based on the embodiment according to the present invention as described above in detail, the electronic image pickup apparatus according to the present invention can be described as follows. It is noted that reference numerals included in the following descriptions correspond to those used in the above-described embodiment according to the present invention. However, they are only added to make the characteristics of the apparatus more easily understood and are not intended to limit the scope of present invention to the specific structural elements described in the above-described embodiment and indicated by the same reference numerals.

1. The electronic image pickup apparatus according to the present invention comprises:
   a main body frame (20a);
   a housing 10 housing the main body frame (20a) and having a battery insertion opening (120) for taking in and out batteries;

a shaft supporting recess portion (114) provided in a position on the inner surface of the housing (10) to face the main body frame (20a) and covered with the main body frame (20a) within the housing (10); and a battery cap (122) having a rotation center shaft (122a) rotatably supported by the shaft supporting recess portion (114) on the inner surface of the housing (10), wherein the main body frame (20a) prevents the center shaft (122a) from separating from the shaft supporting recess portion (114) within the housing (10), and the battery cap (122) is rotatable around the rotation center shaft (122a) between a close position for covering the battery opening (120) of the housing (10) and an open position for opening the battery opening (120).

2. In the apparatus structured as described in the item 1, the battery cap (122) has a pair of rotation center shafts (122a) arranged concentrically and directed opposite each other; a pair of shaft supporting recess portions (114) having radial direction openings (114a) covered with the main body frame (20a) within the housing (10), respectively, are provided in two positions on the inner surface of the housing (10) to face the main body frame (10a), respectively; and the paired rotation center shafts (122a) of the battery cap (122) can be rotatably supported by the paired shaft supporting recess portions (114) on the inner surface of the housing (10).

With such a structure, the battery cap (122) can be supported firmly and rotated smoothly on the housing (10).

3. The electronic image pickup apparatus according to the present invention comprises:

a housing (10) which houses a lens unit (28) for electronically picking up an image, and which has a lens opening (12f) for introducing light into the lens unit (28);

a pair of guide grooves (100, 102) extending parallel with each other on an outer surface of the housing (10) with the lens opening (12f) being interposed therebetween; and a lens barrier (16) having both end portions (16a, 16b) engaged with the paired guide grooves (100, 102) and moving between a close position for closing the lens opening (12f) and an open position for opening the lens opening (12f) while the both end portions (16a, 16b) are guided by the paired guide grooves (100, 102), wherein:

on the outer surface of the housing (10), one (100) of the paired guide grooves (100, 102) opens in a cross direction (C) crossing a front direction (F) to which a front surface area of the housing (10), in which the lens opening (12f) is formed, is directed, and the other (102) of the paired guide grooves (100, 102) opens to the front direction (F), one end portion (16a) of the both end portions (16a, 16b) of the lens barrier (16) corresponding to the one guide groove (100) is inserted into and engaged with the one guide groove (100), to be slidable along the one guide groove (100), the other end portion (16b) of the both end portions (16a, 16b) of the lens barrier (16) corresponding to the other guide groove (102) is inserted into and engaged with the other guide groove (102), to be slidable along the other guide groove (102), and a separation protection member (104) is fixed on the outer surface of the housing (10) to cover at least part of the opening of the other guide groove after the other end portion of the lens barrier has been inserted into the other guide groove, and engages with the other end portion (16b) of the lens barrier (16) in the front direction (F) to prevent the other end portion (16b) of the lens barrier (16) from separating from the opening of the other guide groove (102).

4. In the apparatus structured as described in the item 3, it is preferable that the one guide groove (100) is formed in a lower surface area located below the front surface area on the outer surface of the housing (10) and extending in directions (F, B) crossing the front surface area, and that the other guide groove (102) is formed in the front surface area on the outer surface of the housing (10).

With such a structure, when observing the lens opening (12f) in the front surface area on the outer surface of the housing (10) of the electronic image pickup apparatus, that is, observing the housing (10) in a direction (B) opposite to the front direction (F), the one guide groove (100) cannot be seen and also the other guide groove (102) cannot be seen due to the presence of the separation protection member (104) and a decorative sheet (12b) for covering the separation protection member (104). Thus, the housing (10) of the electronic image pickup apparatus presents a streamlined appearance.

Based on the embodiment according to the present invention, the electronic image pickup apparatus according to the present invention can be further described as follows.

5. The electronic image pickup apparatus according to the present invention comprises:

a battery holder (76b) holding a flat battery (74) at a part of a peripheral surface of the battery (74) and a part of both end surfaces thereof, the flat battery (74) having electrodes on the peripheral surface thereof and on one end surface thereof; and a housing (10) including a battery holder chamber (58) having a battery insertion opening (78) for putting the battery holder (76b) in and out of the chamber (58), the battery holder (76b) being put in and out of the chamber (58) through the battery holder opening (78) while the peripheral surface of the battery (74) is directed to the battery holder opening (78), wherein the battery holder chamber (58) further comprises a first terminal (88) for contacting one electrode on the peripheral surface of the battery (74) held by the battery holder (76b) inserted from the battery holder insertion opening (78) into the chamber (58), and a second terminal (90) for contacting another electrode on one end surface of the battery (74) held by the holder (76b) inserted from the opening (78) into the chamber (58).

6. In the apparatus structured as described in item 5, it is preferable that the battery holder chamber (58) of the housing (10) is defined by a peripheral wall (80) formed by protruding from the inner surface of the housing (10) and facing the peripheral surface of the battery (74) held in the battery holder (76b) within the battery holder chamber (78) in directions except for a direction (M) facing the battery holder opening (78), another end surface facing area (82) surrounded by the peripheral wall (80) on the inner surface of the housing (10) and facing the other end surface of the battery (74) of the battery holder (76b) within the battery holder chamber (58), and a fixed side wall (86) fixed to a protruding end of the peripheral wall (80) and facing the one end surface of the battery (74) of the battery holder (76b) within the battery holder chamber (58), and that the first terminal (88) is provided on the other surface facing area (82) on the inner surface of the housing (10) and the second terminal (90) is provided on the fixed side wall (86).

Since a structure of the battery holder chamber (58) as described above is simple, prior to fixing the fixed side wall

(86) to the protruding end of the peripheral wall (80), the first terminal (88) can be easily provided on the other end surface facing area (82) on the inner surface of the housing (10) through a space surrounded by the protruding end of the peripheral wall (80). The second terminal (90) also can be easily provided on the fixed side wall (86) prior to fixing the fixed side wall (86) to the protruding end of the peripheral wall (80).

7. In the electronic image pickup apparatus structured as described in item 6, the fixed side wall (86) can be made of electric terminal material and the second terminal can be formed by a part of the fixed side wall (86).

The fixed side wall (86) including the second terminal (90) can be easily manufactured, thereby reducing the number of structural elements of the electronic image pickup apparatus of the present invention. As a result, the assembly of the apparatus is made easier.

Based on the embodiment according to the present invention as described above, the electronic image pickup apparatus of the present invention can be further described as follows.

8. The electronic image pickup apparatus according to the present invention comprises:

a housing (10) housing image display means (18) for displaying an image based on an image signal inputted thereto; and a tripod support (60) having a tripod hole and provided at the housing (10), wherein the image display means (18) has at least two protruding pieces (64) protruding in the same direction, and the tripod support (60) is arranged between at least the two protruding pieces (64) of the image display means (18) within the housing (10).

The tripod support (60) protruding between at least two protruding pieces (64) of the image display means (18) in the housing (10) improves an efficiency of using a space within the housing (10) and consequently contributes to realize a smaller, lighter electronic image pickup apparatus. Furthermore, it provides enough space for an arrangement of structural elements within the housing (10), thereby facilitating an assembly of the electronic image pickup apparatus.

9. In the electronic image pickup apparatus structured as described in item 8, it is preferable that: the tripod hole of the tripod support (60) is opened in a cross surface area in the outer surface of the housing (10), and the cross surface area extends in directions (F, B) crossing a rear surface area to which an image display portion (18a) of the image display means (18) is exposed, in the outer surface of the housing (10); the image display means (18) protrudes the at least two protruding pieces (64) toward the cross surface area within the housing (10); a main body frame (20a) is housed in the housing (10); and the image display means (18) is supported by the main body frame (20a) through the at least two protruding pieces (64).

By supporting the image display means (18) on the main body frame (20a) through the at least two protruding pieces (64), the assembly of the electronic image pickup apparatus according to the present invention can be further facilitated.

10. In the electronic image pickup apparatus structured as described in item 8 or 9, the image display means (18) can be a liquid crystal display device.

Based on the embodiment according to the present invention, the electronic image pickup apparatus of the present invention can be further described as follows.

11. The electronic image pickup apparatus according to the present invention comprises:

a housing (10) housing a finder unit (26), electronic image pickup means and image display means (18) and provided with an image display operating member (14c) for operating the image display means (18) on an outer surface thereof, wherein an eyepiece window (14b) of the finder unit (26) is located on a rear surface area, to which the image display portion (18a) of the image display means (18) is exposed, in the outer surface of the housing (10), the eyepiece window is also located in a left side of an image display portion (18a) of the image display means (18) on the rear surface area, and the image display operating member (14c) is located in a right side of the image display portion (18a) on the rear surface area.

With such a structure, a user of the electronic image pickup apparatus can look at the eyepiece window (14b) of the finder unit (26) with his or her right eye while holding a right end portion of the housing (10) of the apparatus with his or her right hand. The user can also freely operate the image display operating member (14c) with his or her right hand. In other words, the user can easily use the electronic image pickup apparatus of the present invention even when picking up an image by the electronic image pickup means and when displaying the image by the image display means (18).

12. In the electronic image pickup apparatus structured as described in item 11, it is preferable that: the eyepiece window (14b) of the finder unit (26) which is located in the left side of the image display portion (18b) in the rear surface area on the outer surface of the housing (10) is also located in the vicinity of an upper end of the rear surface area; and the image display operating member (14c) which is located in the right side of the image display portion (18a) in the rear surface area on the outer surface of the housing (10) is also located in the vicinity of the upper end of the rear surface area.

With such a structure, it is possible to create a space for arranging a photographic lens unit (28) for the electronic image pickup means below the finder unit (26) in the left side of the image display means (18) within the housing (10). This can reduce outer dimensions of the housing (10), in particular, a thickness of the housing (10). Besides, the user can operate the image display operating member (14c) easily with the thumb of his or her right hand while holding the right end portion of the housing (10) with his or her right hand.

Based on the embodiment according to the present invention as described above in detail, the electronic image pickup apparatus according to the present invention can be further described as follows.

13. The electronic image pickup apparatus according to the present invention comprises:

a housing (10) housing a photographic lens unit (28) and image display means (18), wherein the photographic lens unit (28) and the image display means (18) are arranged so as not to overlap each other in a direction along an optical axis of the photographic lens unit (28).

With such a structure, the relatively thick photographic lens unit (28) and the image display means (18) do not overlap each other in the housing (10) in the direction along the optical axis of the photographic lens unit (28). As a result, the outer dimensions of the housing (10), in particular, the thickness of the housing (10), can be reduced.

Additional advantages and modifications will readily occurs to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An electronic image pickup apparatus comprising:

a housing which houses a lens unit for electronically picking up image, and which has a lens opening for introducing light into the lens unit;

a pair of guide grooves extending parallel with each other on an outer surface of the housing with the lens opening interposed therebetween; and a lens barrier having both end portions engaged with the paired guide grooves and being movable between a close position for closing the lens opening and an open position for opening the lens opening while the both end portions are guided by the paired guide grooves, wherein:

one of the paired guide grooves opens in a cross direction crossing a front direction to which a front surface area, in which the lens opening is formed, on the outer surface of the housing, is directed, and the other of the paired guide grooves opens in the front direction on the outer surface of the housing, one of the both end portions of the lens barrier corresponding to the one guide groove is inserted into and engaged with the one guide groove to be slidable along the one guide groove, the other of the both end portions of the lens barrier corresponding to the other guide groove is inserted into and engaged with the other guide groove to be slidable along the other guide groove, and a separation protection member is fixed on the outer surface of the housing to cover at least part of the opening of the other guide groove after the other end portion of the lens barrier has been inserted into the other guide groove, and engages with the other end portion of the lens barrier in the front direction to prevent the other end portion of the lens barrier from separating from the opening of the other guide groove.

2. An apparatus according to claim 1, wherein:

the one guide groove is formed in a lower surface area, located below the front surface area and extending in directions crossing the front surface area, in the outer surface of the housing, and the other guide groove is formed in the front surface area in the outer surface of the housing.

* * * * *